United States Patent
Zadesky et al.

(10) Patent No.: US 11,411,412 B2
(45) Date of Patent: Aug. 9, 2022

(54) BATTERY CHARGING CONTROL BASE ON RECURRING INTERACTIONS WITH AN ELECTRONIC DEVICE

(71) Applicant: Apple Inc., Cupertino, CA (US)

(72) Inventors: Stephen P. Zadesky, Portola Valley, CA (US); Hongli Dai, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 19 days.

(21) Appl. No.: 17/087,253

(22) Filed: Nov. 2, 2020

(65) Prior Publication Data
US 2021/0050730 A1     Feb. 18, 2021

Related U.S. Application Data

(63) Continuation of application No. 16/728,933, filed on Dec. 27, 2019, now Pat. No. 10,840,715, which is a continuation of application No. 16/218,431, filed on Dec. 12, 2018, now Pat. No. 10,523,021, which is a continuation of application No. 15/831,222, filed on Dec. 4, 2017, now Pat. No. 10,170,918, which is a
(Continued)

(51) Int. Cl.
| | |
|---|---|
| H01M 10/44 | (2006.01) |
| H01M 10/46 | (2006.01) |
| H02J 7/00 | (2006.01) |
| H02J 7/04 | (2006.01) |
| H02J 7/02 | (2016.01) |
| H02J 50/00 | (2016.01) |
| H02J 50/10 | (2016.01) |

(52) U.S. Cl.
CPC .............. *H02J 7/0027* (2013.01); *H02J 7/00* (2013.01); *H02J 7/007* (2013.01); *H02J 7/0013* (2013.01); *H02J 7/0029* (2013.01); *H02J 7/0069* (2020.01); *H02J 7/042* (2013.01); *H02J 7/00306* (2020.01); *H02J 7/025* (2013.01); *H02J 50/00* (2016.02); *H02J 50/10* (2016.02); *H02J 2207/40* (2020.01)

(58) Field of Classification Search
CPC .... H02J 7/0013; H02J 7/0069; H02J 7/00306; H02J 7/0029; H02J 7/007; H02J 50/10; H02J 50/005
USPC ....... 320/107, 108, 125, 132, 137, 149, 152, 320/130
See application file for complete search history.

(56) References Cited

U.S. PATENT DOCUMENTS

| | | | |
|---|---|---|---|
| 2,798,895 A | 7/1957 | Nowotny | |
| 2,798,896 A | 7/1957 | Bly | |

(Continued)

FOREIGN PATENT DOCUMENTS

| | | |
|---|---|---|
| CN | 101702412 | 5/2010 |
| EP | 0792741 | 2/1986 |

(Continued)

*Primary Examiner* — Edward Tso
(74) *Attorney, Agent, or Firm* — Brownstein Hyatt Farber Schreck, LLP

(57) ABSTRACT

An electronic device may include a battery, and a charging system in electronic communication with the battery. The charging system may be configured to initiate a charging of the batter when the battery is in a partially-depleted state. The charging system may then discontinue the charging in response to the battery being charged to the threshold charge value, and may monitor the function of the electronic device to predict an event of the electronic device. After the event is predicted, the charging system may determine when to initiate a recharging process, so that the battery is fully charged when the event occurs.

20 Claims, 9 Drawing Sheets

Related U.S. Application Data continuation of application No. 15/086,730, filed on Mar. 31, 2016, now Pat. No. 9,837,835, which is a continuation of application No. 14/201,663, filed on Mar. 7, 2014, now Pat. No. 9,455,582.

(56) References Cited

U.S. PATENT DOCUMENTS

| | | |
|---|---|---|
| 4,152,825 A | 5/1979 | Bruneau |
| 4,344,603 A | 8/1982 | Hozumi |
| 4,455,026 A | 6/1984 | Pinkus |
| 4,709,202 A | 11/1987 | Koenck et al. |
| 5,238,222 A | 8/1993 | Sumida |
| 5,396,163 A | 3/1995 | Nor et al. |
| 5,580,676 A | 12/1996 | Honda et al. |
| 5,736,834 A | 4/1998 | Kuno |
| 5,895,440 A | 4/1999 | Proctor et al. |
| 6,106,973 A | 8/2000 | Sonozaki et al. |
| 6,174,164 B1 | 1/2001 | Masjedi |
| 6,285,166 B1 | 9/2001 | Cannon |
| 6,358,644 B1 | 3/2002 | Shibata et al. |
| 6,368,744 B1 | 4/2002 | Hatazawa et al. |
| 6,448,621 B1 | 9/2002 | Thakur et al. |
| 6,528,204 B1 | 3/2003 | Hikmet et al. |
| 6,549,756 B1 | 4/2003 | Engstrom |
| 6,563,318 B2 | 5/2003 | Kawakami et al. |
| 6,674,265 B2 | 1/2004 | Yoshida et al. |
| 6,683,440 B2 | 1/2004 | Kawakami et al. |
| 6,790,178 B1 | 9/2004 | Mault et al. |
| 6,924,551 B2 | 8/2005 | Rumer et al. |
| 7,012,405 B2 | 3/2006 | Nishida et al. |
| 7,098,627 B2 | 8/2006 | Nishida |
| 7,103,407 B2 | 9/2006 | Hjelt et al. |
| 7,109,684 B2 | 9/2006 | Takaoka et al. |
| 7,193,394 B2 | 3/2007 | Ueda et al. |
| 7,270,910 B2 | 9/2007 | Yahnker et al. |
| 7,282,891 B2 | 10/2007 | Smallwood et al. |
| 7,288,340 B2 | 10/2007 | Iwamoto |
| 7,356,923 B2 | 4/2008 | Honer |
| 7,545,120 B2 | 6/2009 | Breen et al. |
| 7,570,015 B2 | 8/2009 | Bansal et al. |
| 7,622,895 B1 | 11/2009 | Griffin |
| 7,663,064 B2 | 2/2010 | Dutta et al. |
| 7,714,542 B2 | 5/2010 | Lee et al. |
| 7,887,948 B2 | 2/2011 | Jang et al. |
| 7,910,243 B2 | 3/2011 | Koh et al. |
| 7,948,208 B2 | 5/2011 | Partovi et al. |
| 7,952,322 B2 | 5/2011 | Partovi et al. |
| 7,972,721 B2 | 7/2011 | Kozu et al. |
| 7,976,981 B2 | 7/2011 | Lee |
| 8,031,122 B2 | 10/2011 | Jang et al. |
| 8,034,477 B2 | 10/2011 | Yamada |
| 8,040,110 B2 | 10/2011 | Al-Anbuky et al. |
| 8,119,278 B2 | 2/2012 | Bailey et al. |
| 8,124,269 B2 | 2/2012 | Takahashi et al. |
| 8,169,185 B2 | 5/2012 | Partovi et al. |
| 8,183,826 B2 | 5/2012 | Tuffner et al. |
| 8,203,305 B1 | 6/2012 | Wortham et al. |
| 8,237,410 B2 | 8/2012 | Young et al. |
| 8,241,786 B2 | 8/2012 | Taniguchi et al. |
| 8,253,388 B2 | 8/2012 | Cordes et al. |
| 8,259,013 B2 | 9/2012 | Jang et al. |
| 8,260,371 B2 | 9/2012 | Kawata et al. |
| 8,293,402 B2 | 10/2012 | Lee |
| 8,330,427 B2 | 12/2012 | Taniguchi et al. |
| 8,345,420 B2 | 1/2013 | McClure et al. |
| 8,427,825 B2 | 4/2013 | Szczypinski |
| 8,445,125 B2 | 5/2013 | Baek et al. |
| 8,518,569 B2 | 8/2013 | Murphy et al. |
| 8,526,998 B2 | 9/2013 | Koide et al. |
| 8,548,761 B2 | 10/2013 | Lim et al. |
| 8,558,509 B2 | 10/2013 | He et al. |
| 8,598,850 B2 | 12/2013 | Pisharodi |
| 8,603,670 B2 | 12/2013 | Taniguchi et al. |
| 8,629,652 B2 | 1/2014 | Partovi et al. |
| 8,629,654 B2 | 1/2014 | Partovi et al. |
| 8,638,070 B2 | 1/2014 | Maluf et al. |
| 8,679,674 B2 | 3/2014 | Liang et al. |
| 8,778,529 B2 | 7/2014 | Seo |
| 8,796,996 B2 | 8/2014 | Nakatsuji et al. |
| 8,847,543 B2 | 9/2014 | Yagi et al. |
| 8,854,012 B2 | 10/2014 | Dai et al. |
| 8,890,470 B2 | 11/2014 | Partovi |
| 8,896,264 B2 | 11/2014 | Partovi |
| 8,901,881 B2 | 12/2014 | Partovi |
| 8,920,949 B2 | 12/2014 | Hashimoto et al. |
| 8,936,653 B2 | 1/2015 | Kim et al. |
| 8,942,409 B2 | 1/2015 | Kantor et al. |
| 8,947,047 B2 | 2/2015 | Partovi et al. |
| 8,989,821 B2 | 3/2015 | Pope et al. |
| 8,999,566 B2 | 4/2015 | Chung et al. |
| 9,040,192 B2 | 5/2015 | Lee et al. |
| 9,048,679 B2 | 6/2015 | Patino |
| 9,081,068 B2 | 7/2015 | Mattisson et al. |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,136,510 B2 | 9/2015 | Werner |
| 9,172,088 B2 | 10/2015 | Loveness et al. |
| 9,178,369 B2 | 11/2015 | Partovi |
| 9,276,437 B2 | 3/2016 | Partovi et al. |
| 9,301,034 B2 | 3/2016 | Kantor et al. |
| 9,343,716 B2 | 5/2016 | Rothkopf et al. |
| 9,350,188 B2 | 5/2016 | Hasebe et al. |
| 9,356,459 B2 | 5/2016 | Chung |
| 9,356,659 B2 | 5/2016 | Partovi |
| 9,368,995 B2 | 6/2016 | Nishino et al. |
| 9,379,565 B2 | 6/2016 | Woo |
| 9,385,353 B2 | 7/2016 | Byun |
| 9,455,582 B2 | 9/2016 | Zadesky et al. |
| 9,461,501 B2 | 10/2016 | Partovi et al. |
| 9,476,946 B2 | 10/2016 | Schlag et al. |
| 9,479,007 B1 | 10/2016 | Joi et al. |
| 9,496,732 B2 | 11/2016 | Partovi |
| 9,511,679 B2 | 12/2016 | Izumi |
| 9,575,526 B2 | 2/2017 | Nagahama et al. |
| 9,577,440 B2 | 2/2017 | Partovi et al. |
| 9,582,034 B2 | 2/2017 | von Badinski et al. |
| 9,593,969 B2 | 3/2017 | King |
| 9,634,295 B2 | 4/2017 | Dube |
| 9,692,949 B2 | 6/2017 | Hollinger et al. |
| 9,720,467 B2 | 8/2017 | Jain et al. |
| 9,722,447 B2 | 8/2017 | Partovi |
| 9,768,473 B2 | 9/2017 | Roh et al. |
| 9,774,193 B2 | 9/2017 | Gaylo et al. |
| 9,793,721 B2 | 10/2017 | Partovi et al. |
| 9,812,680 B2 | 11/2017 | Werner et al. |
| 9,837,835 B2 | 12/2017 | Zadesky et al. |
| 9,837,846 B2 | 12/2017 | Partovi |
| 9,879,652 B2 | 1/2018 | Eden et al. |
| 9,917,335 B2 | 3/2018 | Jarvis et al. |
| 10,115,520 B2 | 10/2018 | Partovi |
| 2002/0094475 A1 | 7/2002 | Aoyama |
| 2003/0129483 A1 | 7/2003 | Gross |
| 2004/0130294 A1 | 7/2004 | Ng et al. |
| 2005/0142439 A1 | 6/2005 | Lee et al. |
| 2005/0225299 A1 | 10/2005 | Petrovic |
| 2006/0164035 A1 | 7/2006 | Van Beek et al. |
| 2007/0260136 A1 | 11/2007 | Hunter |
| 2007/0264535 A1 | 11/2007 | Lee et al. |
| 2008/0001573 A1 | 1/2008 | Carey |
| 2008/0286644 A1 | 11/2008 | Yeo |
| 2009/0243549 A1 | 10/2009 | Matsumura et al. |
| 2009/0317708 A1 | 12/2009 | Brandl et al. |
| 2010/0026240 A1 | 2/2010 | Jiang et al. |
| 2010/0052603 A1 | 3/2010 | Bourilkov et al. |
| 2010/0081049 A1 | 4/2010 | Holl et al. |
| 2010/0316911 A1 | 12/2010 | Tesson et al. |
| 2011/0014954 A1 | 1/2011 | Dossas et al. |
| 2011/0043309 A1 | 2/2011 | Wamala et al. |
| 2011/0050164 A1 | 3/2011 | Partovi et al. |
| 2011/0175569 A1 | 7/2011 | Austin |
| 2011/0215480 A1 | 9/2011 | Gorczyca et al. |

(56) References Cited

U.S. PATENT DOCUMENTS

| | | |
|---|---|---|
| 2011/0223447 A1 | 9/2011 | Ignor et al. |
| 2011/0236727 A1 | 9/2011 | Jang |
| 2012/0116176 A1 | 5/2012 | Moravec et al. |
| 2012/0121944 A1 | 5/2012 | Yamamoto et al. |
| 2012/0176095 A1 | 7/2012 | Okuda et al. |
| 2012/0286739 A1 | 11/2012 | O'Brien et al. |
| 2012/0305605 A1 | 12/2012 | Vaussaux et al. |
| 2012/0319653 A1 | 12/2012 | Kumar et al. |
| 2013/0071696 A1 | 3/2013 | Kim et al. |
| 2013/0093388 A1 | 4/2013 | Partovi |
| 2013/0119942 A1 | 5/2013 | Sutarwala et al. |
| 2013/0260677 A1 | 10/2013 | Partovi |
| 2013/0271069 A1 | 10/2013 | Partovi |
| 2013/0285605 A1 | 10/2013 | Partovi |
| 2014/0055085 A1 | 2/2014 | Downey et al. |
| 2014/0147703 A1 | 5/2014 | Werner et al. |
| 2014/0191568 A1 | 7/2014 | Partovi |
| 2015/0130412 A1 | 5/2015 | Partovi |
| 2015/0188324 A1 | 7/2015 | Nicholson et al. |
| 2015/0255776 A1 | 9/2015 | Dabov |
| 2015/0276885 A1 | 10/2015 | Hariharasudhan et al. |
| 2015/0357859 A1 | 12/2015 | Pourdarvish et al. |
| 2016/0049821 A1 | 2/2016 | Aridome |
| 2016/0064960 A1 | 3/2016 | DiCarlo et al. |
| 2016/0064961 A1 | 3/2016 | DiCarlo et al. |
| 2016/0260945 A1 | 9/2016 | Rothkopf et al. |
| 2016/0276842 A1 | 9/2016 | Shizuno et al. |
| 2018/0097377 A1 | 4/2018 | Zadesky et al. |
| 2018/0159183 A1 | 6/2018 | Jarvis et al. |

FOREIGN PATENT DOCUMENTS

| | | |
|---|---|---|
| EP | 1931010 | 6/2008 |
| EP | 2540221 | 1/2013 |
| EP | 2653053 | 10/2013 |
| JP | 61032951 | 2/1986 |
| JP | 63314770 | 12/1988 |
| JP | 10012200 | 1/1998 |
| JP | 2000058018 | 2/2000 |
| JP | 2001118547 | 4/2001 |
| JP | 2001250515 | 9/2001 |
| JP | 2001250516 | 9/2001 |
| JP | 2001332752 | 11/2001 |
| JP | 2002142378 | 5/2002 |
| JP | 2005108750 | 4/2005 |
| JP | 2005129260 | 5/2005 |
| JP | 2005268138 | 9/2005 |
| JP | 2007048725 | 2/2007 |
| JP | 2007165200 | 6/2007 |
| JP | 2010021074 | 1/2010 |
| KR | 20010007769 | 2/2005 |
| KR | 20090075396 | 7/2009 |
| WO | WO00/41252 | 7/2000 |
| WO | WO2008/023199 | 2/2008 |
| WO | WO2011/000239 | 1/2011 |
| WO | WO2011/095758 | 8/2011 |

# BATTERY CHARGING CONTROL BASE ON RECURRING INTERACTIONS WITH AN ELECTRONIC DEVICE

CROSS-REFERENCE TO RELATED APPLICATION(S)

This application is a continuation patent application of U.S. patent application Ser. No. 16/728,933, filed Dec. 27, 2019 and titled "Wireless Charging Control based on Electronic Device Events," which is a continuation patent application of U.S. patent application Ser. No. 16/218,431, filed Dec. 12, 2018 and titled "Wireless Charging Control Based on Electronic Device Events," now U.S. Pat. No. 10,523,021, which is a continuation patent application of U.S. patent application Ser. No. 15/831,222, filed Dec. 4, 2017 and titled "Electronic Device Wireless Charging System," now U.S. Pat. No. 10,170,918, which is a continuation patent application of Ser. No. 15/086,730, filed Mar. 31, 2016 and titled "Electronic Device Charging System," now U.S. Pat. No. 9,837,835, which is a continuation patent application of U.S. patent application Ser. No. 14/201,663, filed Mar. 7, 2014 and titled "Electronic Device and Charging Device for Electronic Device," now U.S. Pat. No. 9,455,582, the disclosures of which are hereby incorporated herein by reference in their entireties.

TECHNICAL FIELD

The disclosure relates generally to electronic devices and, more particularly, to an electronic device, a charging device, and a method for charging the battery of the electronic device.

BACKGROUND

Current electronic devices continue to become more prevalent in day-to-day activities. For example, smart phones and tablet computers continue to grow in popularity and provide everyday personal and business functions to its users. These electronic devices are usually operational for the majority of a typical day, where a user may utilize the electronic device to send messages (e.g., text and e-mail), work on documents, play games, conduct phone calls, and perform other personal and/or business specific tasks.

With extensive daily use, a long battery life is one of the most important operational characteristics of the electronic device. However, as the overall size of the electronic device continues to get smaller, the internal space of the electronic device also gets smaller. This reduced internal space may result in a smaller battery as well. With a smaller battery in an electronic device, the battery may need to be charged daily—or even several times a day.

The charging of the electronic device typically includes electrically coupling the electronic device to a charging device. The charging device may provide an electrical current to the electronic device, and the electronic device may convert the current to charge the battery. Conventional charging devices for the electronic device may charge a depleted battery to a threshold charge value (e.g., 100%). Once the battery reaches the threshold charge value, the conventional charging device may stop providing an electrical current to the electronic device, which may ultimately allow the maximum charged battery to deplete. When the battery depletes to a predetermined minimum charge value (e.g., 90%), the charging device may once again provide electrical current to the electronic device to charge the battery to the threshold charge value again. When an electronic device remains connected to the conventional charging device, the cycle between threshold charge value and predetermined minimum charge value may occur several times.

With each charge to the threshold charge value and/or each cycle between the threshold charge value and the predetermined minimum charge value, the life of certain types of batteries may be reduced. More specifically, each time such batteries cycle between the threshold charge value and predetermined minimum charge value during the conventional charging process, the battery's ability to hold a maximum charge for a duration of time may be substantially reduced. Over time the reduction in the battery's ability to hold the charge may result in the battery needing to be charged several times a day. When the battery cannot be charged several times a day, the battery may be completely depleted and the electronic device may be inoperable (e.g., shutdown due to lack of power).

SUMMARY

Generally, embodiments discussed herein are related to an electronic device, a charging device and a method for charging the battery of the electronic device. The electronic device may include a battery and a charging system for charging the battery. The charging system may be configured to monitor the activities and/or events of the electronic device to ensure that the battery is substantially charged prior to, or immediately after the occurrence of an event. That is, the charging of the battery may be dependent upon the monitoring and/or the occurrence of activities and events of the electronic device, and not cycling between threshold charge values and minimum charge values. As a result, the charging system of the electronic device may substantially prevent undesirable depletion of the battery's ability to maintain a charge. That is, by eliminating the cycling charging of the battery of the electronic device, the charging system of the electronic device may minimize and substantially prevent the depletion of the battery's ability to maintain a charge.

One embodiment may include an electronic device. The electronic device may include a battery and a charging system in electronic communication with the battery. The charging system may be configured to charge at least a partially-depleted battery to a threshold charge value, discontinue the charging in response to the battery being charged to the threshold charge value, and monitor the function of the electronic device to detect at least one of an anticipated event and an unanticipated event of the electronic device. Additionally, the charging system may be configured to recharge the battery in response to detecting one of the anticipated event occurring subsequent to the recharging of the battery or the unanticipated event occurring immediately before the recharging of the battery.

Another embodiment may include a charging device for an electronic device. The charging device may include a connection portion electrically coupled to a battery of the electronic device, and a charging system in electronic communication with the battery of the electronic device. The charging system may be configured to charge at least a partially-depleted battery to a threshold charge value, discontinue the charging in response to the battery being charged to the threshold charge value, and monitor the function of the electronic device to detect at least one of an anticipated event and an unanticipated event of the electronic device. Additionally, the charging system may be configured to recharge the battery in response to detecting one of the anticipated event occurring subsequent to the recharging of the battery or the unanticipated event occurring immediately before the recharging of the battery.

A further embodiment may include a method for charging a battery of an electronic device. The method may include charging at least a partially-depleted battery for the electronic device to a threshold charge value, discontinuing the charging in response to the battery being charged to the threshold charge value, and monitoring the function of the electronic device to detect at least one of an anticipated event and an unanticipated event of the electronic device. The method may also include recharging the battery in response to detecting one of the anticipated event occurring subsequent to the reactivation of the charging device or the unanticipated event occurring immediately before the reactivation of the charging device.

BRIEF DESCRIPTION OF THE DRAWINGS

The disclosure will be readily understood by the following detailed description in conjunction with the accompanying drawings, wherein like reference numerals designate like structural elements, and in which.

Figure 1:
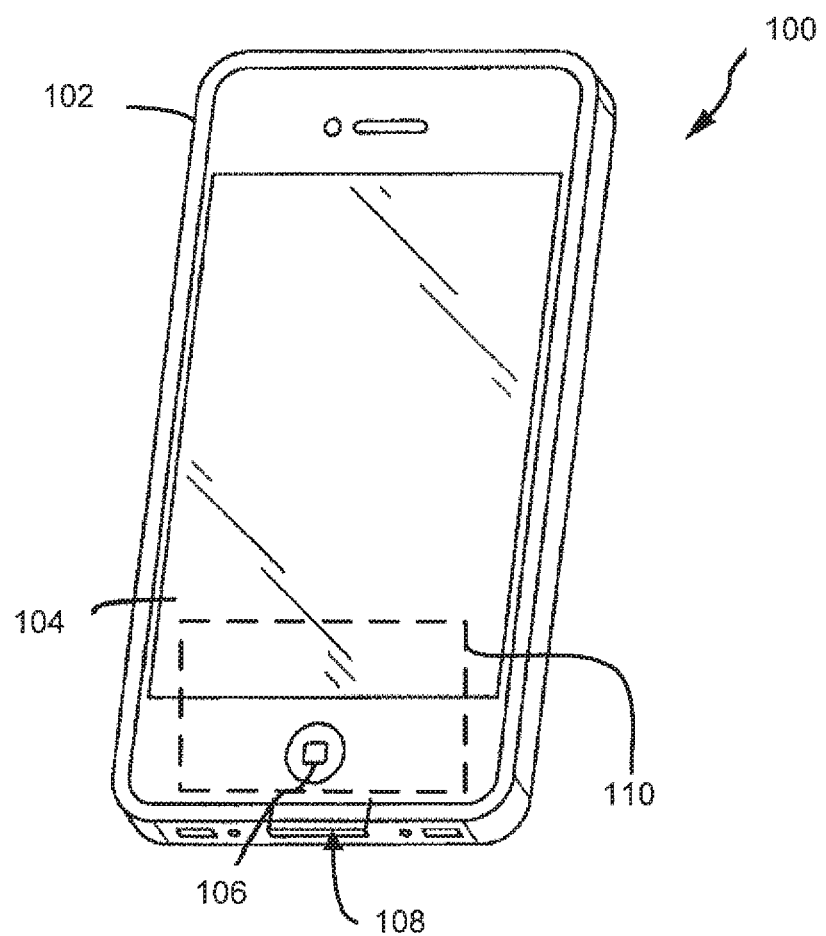
FIG. 1A shows an illustrative perspective view of an electronic device including a battery, according to embodiments.
FIG. 1B shows an illustrative block diagram of the electronic device including the battery as shown in FIG. 1A, according to embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices and, more particularly, to a charging device and a method for charging a battery of an electronic device.

In a particular embodiment, the electronic device may include a battery and a charging system for charging the battery. The charging system may be configured to monitor the activities and/or events of the electronic device to ensure that the battery is substantially charged prior to, or immediately after the occurrence of, an event. That is, the charging of the battery may be dependent upon the monitoring and/or the occurrence of activities and events of electronic device, and not upon cycling between threshold charge values and minimum charge values. As a result, the charging system of the electronic device may substantially prevent undesirable depletion of the battery's ability to maintain a charge. By eliminating the cycling charging of the battery of the electronic device, the charging system of the electronic device may minimize and substantially prevent the depletion of the battery's ability to maintain a charge.

The electronic device may include a battery and a charging system in electronic communication with the battery. The charging system may be configured to charge at least a partially-depleted battery to a threshold charge value, discontinue the charging in response to the battery being charged to the threshold charge value, and monitor the function of the electronic device to detect at least one of an anticipated event and an unanticipated event of the electronic device. Additionally the charging system may be configured to recharge the battery in response to detecting an anticipated event, occurring subsequent to the recharging of the battery, or an unanticipated event, occurring immediately before the recharging of the battery. A charging device and charging methods are also disclosed.

These and other embodiments are discussed below with reference to FIGS. 1A-7. However, those skilled in the art will readily appreciate that the detailed description given herein with respect to these Figures is for explanatory purposes only and should not be construed as limiting.

FIG. 1A shows a perspective view of one example of an electronic device that can include, or be connected to, a charging system. In the illustrated embodiment, the electronic device 100 is implemented as a smart telephone. Other embodiments may implement the electronic device differently, such as, for example, a laptop or desktop computer, a tablet computing device, a gaming device, a display, a digital music player, a wearable computing device or display such as a watch or glasses, and other types of electronic devices that may receive biometric data from a biometric sensing device.

The electronic device 100 includes an enclosure 102 at least partially surrounding a display 104 and one or more buttons 106 or input devices. The enclosure 102 may form an outer surface, or partial outer surface, and protective case for the internal components of the electronic device 100, and may at least partially surround the display 104. The enclosure 102 may be formed of one or more components operably connected together, such as a front piece and a back piece. Alternatively, the enclosure 102 may be formed of a single piece operably connected to the display 104.

The electronic device 100 may also include a battery charging port 108. As shown in FIG. 1A, the battery charging port 108 may be in electronic communication with the battery 110 of the electronic device 100. More specifically, the battery charging port 108 may include an aperture configured to receive a portion of a charging device 200 (see FIGS. 2A and 2B) for charging the battery 110. That is, the battery charging port 108 may be coupled to the charging device 200, such that the charging device 200 may provide an electric current to the electronic device 100 to substantially charge the battery 110, as discussed herein.

Figure 1B:
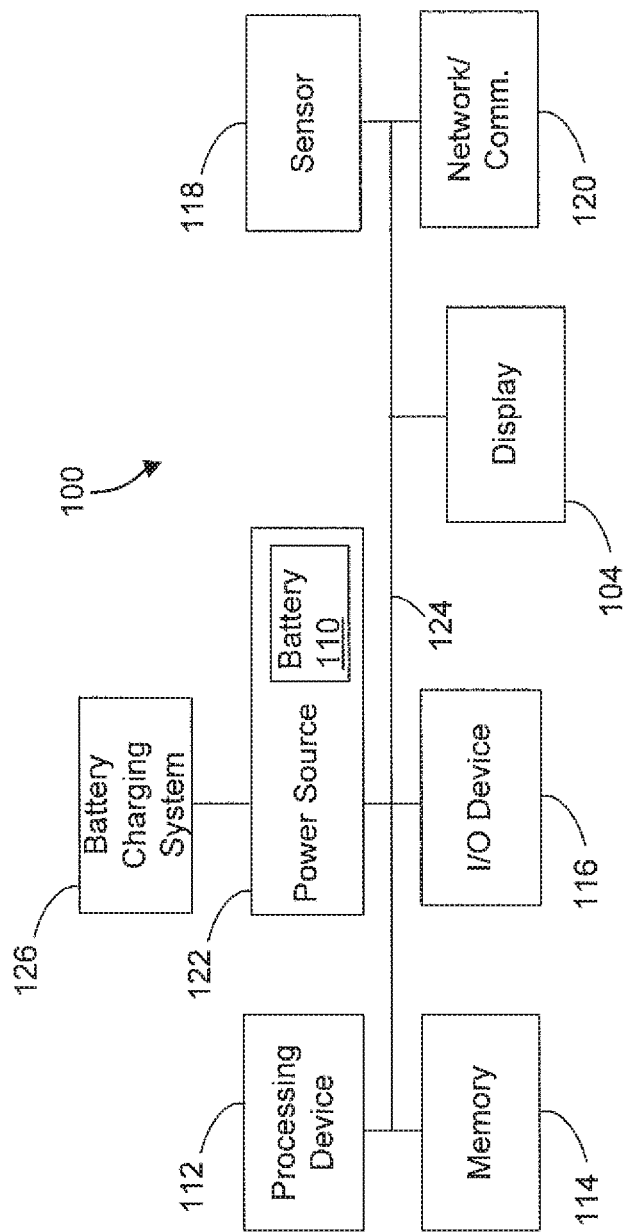

FIG. 1B is an illustrative block diagram of the electronic device 100 shown in FIG. 1A. The electronic device 100 may include the display 104, a processing device 112, memory 114, an input/output (I/O) device 116, a sensor 118, a network communications interface 120, and a power source 122. The display 104 may display an image or video output for the electronic device 100. The display 104 may also provide an input region for one or more input devices 116, such as, for example, a touch sensing device and/or a fingerprint sensing device. The display 104 may be substantially any size and may be positioned substantially anywhere on the electronic device 100.

The processing device 112 may control some or all of the operations of the electronic device 100. The processing device 112 may communicate, either directly or indirectly, with substantially all of the components of the electronic device 100. For example, a system bus or signal line 124 or other communication mechanisms may provide communication between the processing device 112, the memory 114, the I/O device 116, the sensor 118, the network communications interface 120, and/or the power source 122. The processing device 112 may be implemented as any electronic device capable of processing, receiving, or transmitting data or instructions. For example, the processing device 112 may be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 114 may store electronic data that may be used by the electronic device 100. More specifically, in a non-limiting example, memory 114 for the electronic device 100 may store electrical data or content relating to the charging of the battery 110, as discussed herein. The memory 114 may be configured as any type of memory. By way of example only, the memory 114 may be implemented as random access memory, read-only memory, Flash memory, removable memory, or other types of storage elements, or combinations of such devices.

The electronic device 100 may also include one or more sensors 118 positioned substantially anywhere on the electronic device 100. The sensor(s) 118 may be any conventional sensor for determining an amount of electrical current being provided to the electronic device 100, or a sensor configured to determine a time for receiving electrical current during the charging processes discussed herein.

The power source 122 may be implemented with any device capable of providing energy to the electronic device 100. That is, the power source 122 may be one or more disposable batteries or rechargeable batteries (e.g., battery 110) of the electronic device 100. More specifically, as shown in FIG. 1B, the power source 122 may include the battery 110. Additionally, and as discussed in detail herein, the power source 122 may include a connection cable or the charging device 200 (see FIGS. 2A and 2B), that may connect the electronic device 100, and specifically the battery 110, to another power source such as a wall outlet, USB outlet or port, or 12V outlet.

The power source 122 may be connected to a battery charging system 126 (hereafter, the "charging system 126"). The charging system 126 may be included within the electronic device 100, in electronic communication with the power source 122 and/or the battery 110, or the charging system 126 may be included directly within the power source 122, as discussed herein. The charging system 126 is generally configured to charge the battery 110 of the electronic device 100 based on events (e.g., interactions and/or programs) that may take place on/with the electronic device 100. That is, and as discussed in detail herein, the charging system 126 may be configured to charge the battery 110 based on anticipated and/or unanticipated events of the electronic device 100, and not on predetermined charge values of the electronic device 100. In one embodiment, the charging system 126 may include a processing device and a memory. Any suitable processing device and memory may be used in the charging system 126. It is understood that other components may be included in the charging system 126 in some embodiments. The charging system 126 is described in more detail in conjunction with FIGS. 3-7.

Figure 2A:
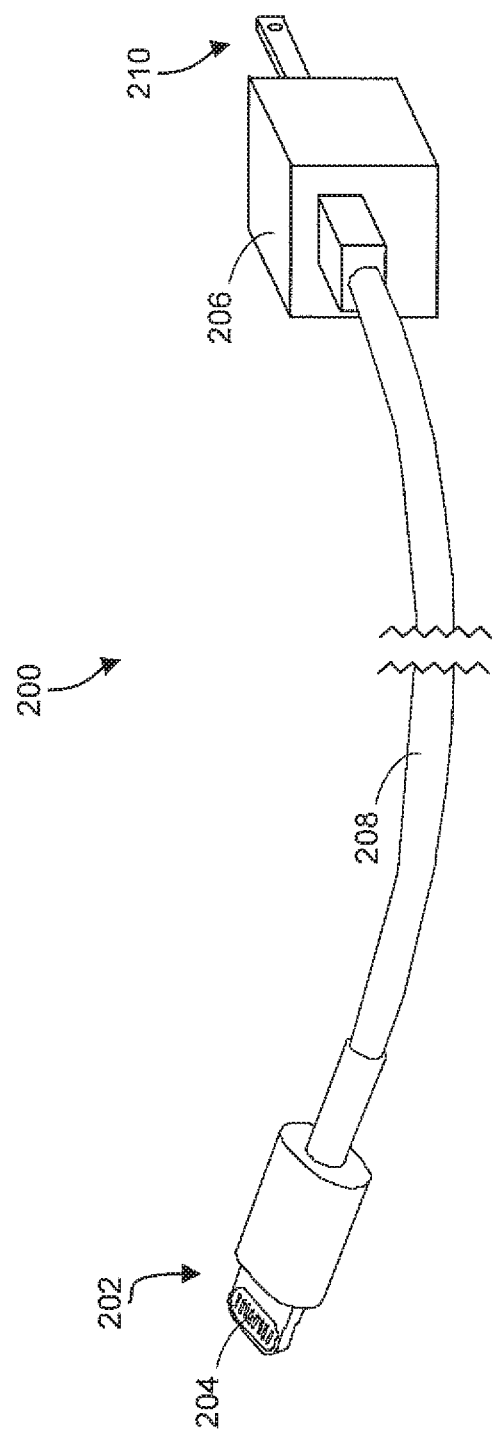
FIG. 2A shows an illustrative perspective view of a charging device including a charging system, according to embodiments.
Figure 2B:
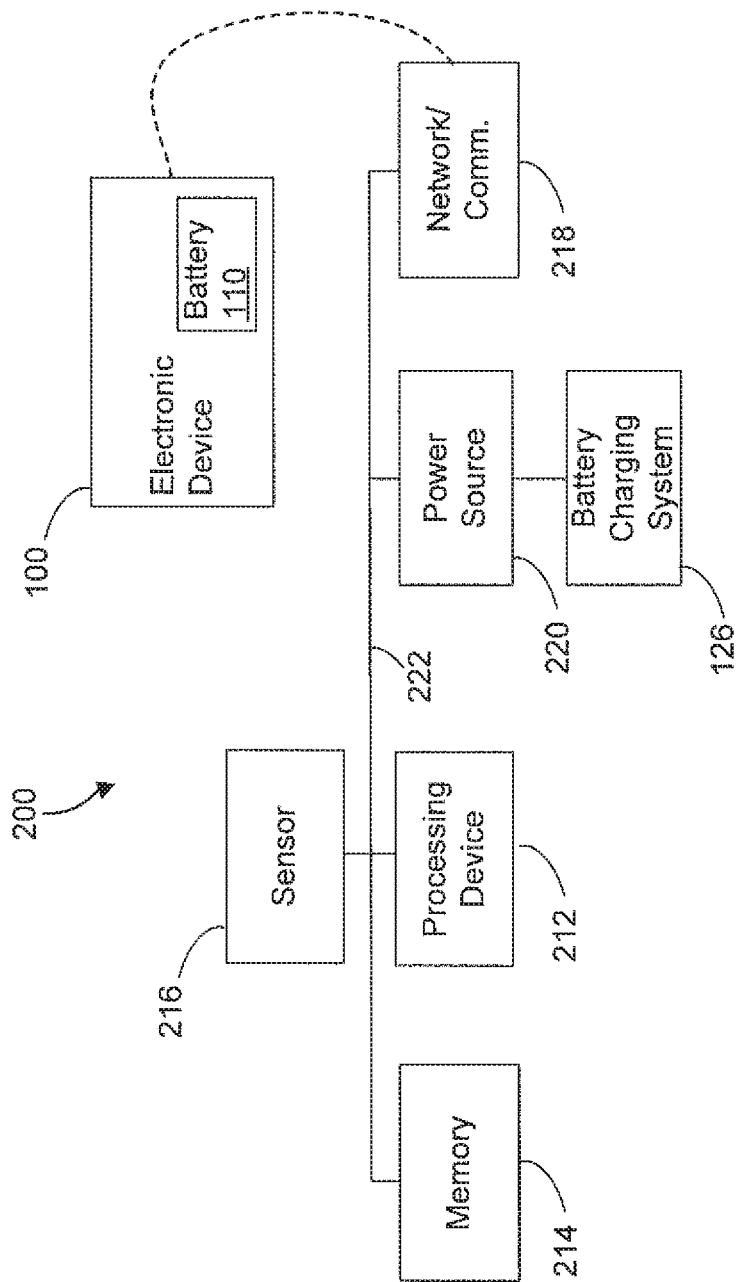
FIG. 2B shows an illustrative block diagram of the charging device including the charging system as shown in FIG. 2A, according to embodiments.

As discussed above, the battery 110 of the electronic device 100 (see FIG. 1A) may be charged using the charging device 200, as shown in FIGS. 2A-2B. More specifically, as shown in FIG. 2A, the charging device 200 may include a connection portion 202 configured to be coupled to the electronic device 100 (FIG. 1A), and in electronic communication with the battery 110 to provide an electrical current to charge the battery 110. The charging device 200 may include a plurality of contact pins 204 positioned on the connection portion 202. Contact pins 204 may contact corresponding contact pins (not shown) positioned within the battery charging port 108 of the electronic device 100 for transferring the electrical current provided by the charging device 200 to the electronic device 100, to ultimately charge the battery 110.

As shown in FIG. 2A, the connection portion 202 may be coupled to the housing 206 of the charging device 200 via insulated wires 208. More specifically, insulated wires 208 may be positioned between the connection portion 202 and the housing 206 of the charging device 200, and may substantially provide an electrical current from the housing 206 to the connection portion 202 to be subsequently provided to the electronic device 100. The housing 206 may be configured to draw an electrical current from any conventional power source. For example, as shown in FIG. 2A, the housing 206 may include a two-prong AC power plug 210, which may be configured to be inserted into a conventional wall socket or plug to draw an electrical current to the charging device 200. Although shown as an AC power plug 210, the housing 206 and/or the charging device 200 may be provided with the electrical current from any conventional power supply including, but not limited to, a USB port or a 12V outlet.

As discussed above, the charging device 200 may be configured to provide an electrical current to the electronic device 100 including the charging system 126, to charge the battery 110. In an alternative embodiment, the charging device 200, as shown in FIG. 2A, may include the charging system 126, rather than the electronic device 100, and the charging device 200 may be configured to charge the battery 110 using the processes discussed herein with respect to FIG. 3. That is, the charging system 126 may be distinct from the electronic device 100 and may be included in the housing 206 of the charging device 200.

Although shown as a single device that may be electrically coupled to the electronic device 100, the charging device 200 may include an inductive or wireless charging system that may include the charging system 126. That is, the charging device 200 may be configured as an inductive or wireless charging system including the charging system 126, that may be configured to charge the battery 110 of the electronic device 100 using the processes discussed herein with respect to FIG. 3.

FIG. 2B is an illustrative block diagram of the charging device 200 shown in FIG. 2A. The charging device 200 may include a processing device 212, memory 214, sensors 216, a network communications interface 218, and a power source 220. The charging device 200 may include substantially similar components as those components of the electronic device 100 discussed with respect to FIG. 1B. As such, redundant explanation of those components may be omitted for clarity.

The processing device 212 may control some or all of the operations of the charging device 200. The processing device 212 may communicate, either directly or indirectly, with substantially all of the components of the charging device 200. For example, a system bus, signal line 222, or other communication mechanisms may provide communication between the processing device 212, memory 214, sensors 216, the network communications interface 218 and/or the power source 220. The processing device 212 may be implemented as any electronic device capable of processing, receiving, or transmitting data or instructions. For example, the processing device 212 may be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

It should be noted that FIGS. 1A-2B are illustrative only. In other examples, an electronic device and/or charging device may include fewer or more components than those shown in FIGS. 1A-2B.

Figure 3:
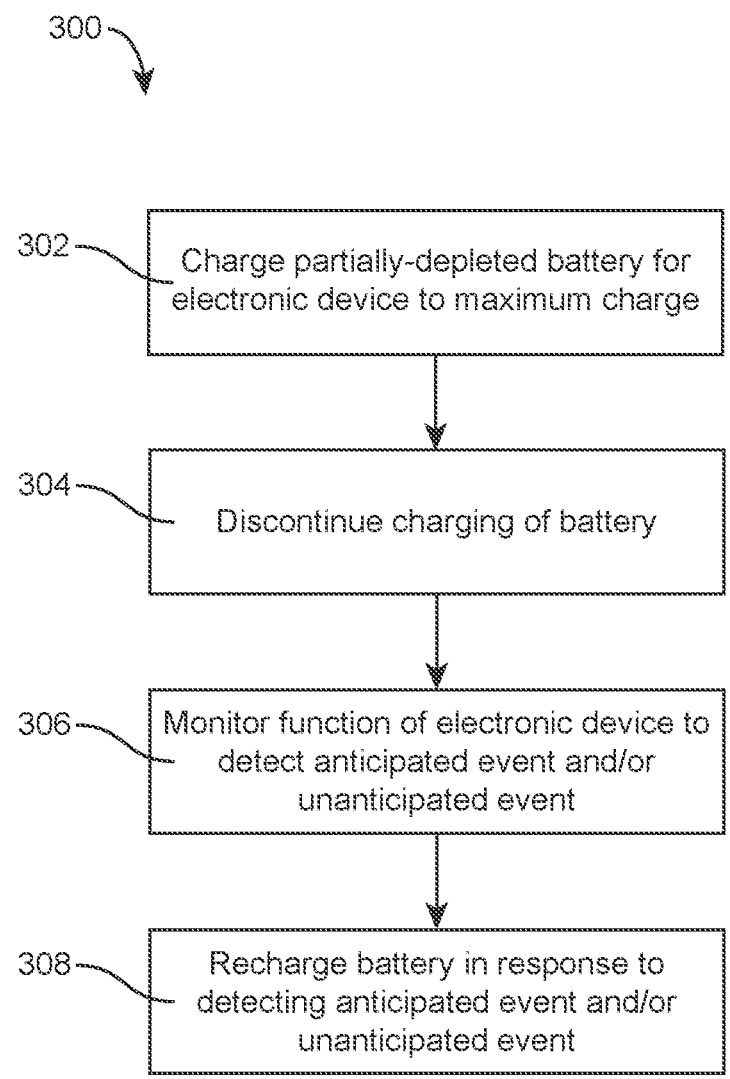
FIG. 3 shows a flowchart illustrating a method for charging a battery of an electronic device. This method may be performed on the battery of the electronic device as shown in FIGS. 1A and 1B.

Turning to FIG. 3, and with continued reference to FIGS. 1A-2B, a process for charging the battery 110 of the electronic device 100 (see FIGS. 1A and 1B) may now be discussed. Specifically, FIG. 3 is a flowchart depicting one sample method 300 for charging the battery 110 using the charging system 126 of the electronic device 100 or the charging device 200. That is, the sample method for charging the battery 110, as depicted in FIG. 3 and discussed herein, may be implemented by the charging system 126, regardless of the charging system 126 being included within the electronic device 100, or the charging device 200.

In operation 302, a partially-depleted battery 110 for electronic device 100 may be charged to a threshold charge value. The partially-depleted battery 110 may include any charge value that is below the maximum charge. That is, when the threshold charge value includes a fully charged (e.g., 100%) battery 110, partially-depleted battery 110 may include a charge value less than the maximum charge (e.g., 90-0%). The partially-depleted battery 110 of the electronic device 100 may be charged using the charging device 200 configured to be electrically coupled to the battery charging port 108 of the electronic device 100, when the charging device 200 may provide electrical currents to the electronic device 100. It is understood that the charge of the battery 110 may be depleted as a result of a variety of factors including, but not limited to: extended use of the electronic device 100, non-charging of the electronic device 100, and/or the operational life of the battery 110 for the electronic device 100.

In operation 304, the charging of the battery 110 of the electronic device 100 may be discontinued in response to the battery 110 being charged to the threshold charge value. That is, when the partially-depleted battery 110 of operation 302 is charged to the threshold charge value (e.g., 100%), the electric current provided to the electronic device 100 to charge the battery 110 may be discontinued. In response to the discontinuing of the charging of the battery 110 of the electronic device 100, the charge value of the battery 110 may gradually deplete. That is, as a result of discontinuing the charge to the battery 110, the charge value of the battery 110 may deplete or lessen from the threshold charge value over time.

As discussed herein, the charging system 126 may recognize that the battery 110 has been charged to the threshold charge value, and may subsequently discontinue the charge provided to the battery 110 in operation 302. That is, the charging system 126 may be in electronic communication with the power source 122 including the battery 110, and may monitor the charge value of the battery 110 to determine when the battery 110 is charged to the threshold charge value. When the charging system 126 determines that the battery 110 is charged to the threshold charge value, the charging system 126 may discontinue the charge.

The charging system 126 may discontinue the charge by stopping the electrical current from flowing from the charging device 200 (see FIG. 2A) to the electronic device 100. More specifically, the charging system 126, in electronic communication with the power source 122 and the battery 110, may discontinue the draw of electrical current from the charging device 200, which may ultimately stop current from flowing to the battery 110. In an alternative embodiment, the charging system 126 may be in electronic communication with an internal contact pins (not shown) of the electronic device 100 and/or contact pins 204 for the charging device 200 used for charging the battery 110. When the battery 110 is charged to the threshold charge value, the charging system 126 may temporarily disconnect the contact pins (e.g., contact pins 204), which may ultimately prevent the electrical current provided by the charging device 200 to reach the electronic device 100 and/or the battery 110.

In an alternative embodiment, when the charging device 200 includes an inductive or wireless system including the charging system 126, the charge to the battery 110 of the electronic device 100 may also be discontinued in response to the battery 110 being charged to the threshold charge value. More specifically, the charging system 126 of an inductive or wireless system may disconnect or discontinue the transmission of electrical current to the battery 110 of the electronic device 100, once the charging system 126 determines the battery 110 is charged to the threshold charge value.

As such, the discontinuing of the charge to the battery 110 in operation 304 may also include maintaining the electrical coupling between the charging device 200 and the battery 110 of the electronic device 100. That is, as a result of the charging system 126 controlling and/or discontinuing the charge provided to the battery 110, the charging device 200 may remain substantially coupled to the battery charging port 108 and may remain electrically coupled to the battery 110. As discussed herein, by maintaining the electrical coupling between the charging device 200 and the battery 110 of the electronic device 100, the charging system 126 may reactivate or recharge the battery 110.

In operation 306, a function of the electronic device 100 may be monitored to detect an anticipated event and/or an unanticipated event of the electronic device 100. That is, the charging system 126 may monitor the function, operation and/or interactions of the electronic device 100, when electrically coupled to the charging device 200, to detect anticipated and/or unanticipated events that may take place on or with respect to the electronic device 100.

The anticipated events of the electronic device 100 detected during the monitoring process in operation 306 may include a predetermined operation of the electronic device 100, and/or a reoccurring interaction with the electronic device 100.

For example, a predetermined operation of the electronic device 100 may be a scheduled alarm set on the electronic device 100. More specifically, the electronic device 100 may be configured to include a programmable alarm that may alert a user of the electronic device 100 at a predetermined time.

A reoccurring interaction with the electronic device 100 may be a learned and/or regular interaction a user may have with the electronic device 100. In an example, the reoccurring interaction with the electronic device 100 may include a substantially consistent, and regular times for coupling and uncoupling the charging device 200 to the electronic device 100. That is, the reoccurring interaction with the electronic device 100 may be learned by the charging system 126 when a user regularly couples the electronic device 100 to the charging device 200 at a first time, and uncouples the electronic device 100 from the charging device 200 at a second time.

The unanticipated events of the electronic device 100 detected during the monitoring process in operation 306 may include a spontaneous, unexpected interaction with the electronic device 100. As one example, an unanticipated event of the electronic device 100 may include a user randomly interacting with the electronic device 100 when the electronic device 100 is electrically coupled to the charging device 200. For example, when a user electrically couples the electronic device 100 to the charging device 200 while the user sleeps, an unanticipated event may include the user unexpectedly checking the time using the electronic device 100 after randomly waking-up.

In operation 308, the battery 110 of the electronic device 100 may be recharged in response to detecting one of an anticipated event and/or an unanticipated event. More specifically, the charging system 126 may reactivate or continue the charging of the battery 110 in response to detecting an anticipated event and/or an unanticipated event during the monitoring of the function of electronic device during operation 306. The detected anticipated event may occur a predetermined time subsequent to the recharging of the battery 110. That is, and as discussed herein, the recharging of the battery 110 may begin a predetermined time before the detected, anticipated event is expected to occur. Additionally, the detected unanticipated event may occur immediately before the recharging of the battery 110 of operation 308. More specifically, and discussed herein, the recharging of the battery 110 may begin immediately after the detected, unanticipated event occurs.

When an anticipated event is detected or predicted in operation 306, the recharging of the battery 110 in operation 308 may include charging the battery 110 to the threshold charge value (e.g., 100% charge) prior to the occurrence of the anticipated event. That is, when an anticipated event is expected to occur on the electronic device 100, the charging system 126 may begin to charge the battery 110 a predetermined time prior to the expected occurrence of the anticipated event to ensure the battery 110 is charged to the threshold charge value prior to the occurrence of the anticipated event. Additionally, when an anticipated event is detected in operation 306, the recharging of the battery 110 in operation 308 may include charging the battery 110 at a first rate prior to the occurrence of the anticipated event. That is, charging system 126 may be configured to provide the battery 110 a charge within a plurality of distinct charging rates, including a first charging rate, which may be used to charge the battery 110 when an anticipated event is detected. As such, during the recharging of the battery 110 of electronic device 100 in operation 308, the charging system 126 may begin to charge the battery 110 at a first rate, a predetermined time prior to the expected occurrence of the anticipated event. As can be understood, the predetermined time to begin recharging the battery 110 of the electronic device 100 may be determined based on a variety of operational functions of the electronic device 100 and/or the charging system 126 including, but not limited to the charging rate used to charge the battery 110 and the charge value of the partially depleted battery 110 (e.g., as in operation 304).

When an unanticipated event is detected in operation 306, the recharging of the battery 110 in operation 308 may include charging the battery 110 to the threshold charge value (e.g., 100%) or to a nearly threshold charge value, subsequent to the occurrence of the unanticipated event. That is, when the unanticipated event is detected on the electronic device 100, the battery 110 may be charged to the threshold charge value, or as close to the threshold charge value as possible after the unanticipated event occurs, but prior to the disconnection between the electronic device 100 and the charging device 200. Additionally, in detecting the unanticipated event in operation 306, the recharging of the battery 110 in operation 308 may include charging the battery 110 at a second rate, distinct from the first rate, immediately after the occurrence of the unanticipated event. As discussed above, the charging system 126 may be configured to provide the battery 110 a charge with a plurality of distinct charging rates. As such, when the unanticipated event is detected, the charging system 126 may charge the battery 110 at a second rate, distinct (e.g., greater) from the first rate, to charge the battery 110 to the threshold charge value, or as close to the threshold charge value as possible.

Although depicted in FIG. 3 and discussed herein as occurring subsequent to the charging in operation 302, and the discontinuing of the charge in operation 304, the monitoring of the function of the electronic device 100 in operation 306 may occur prior to, or simultaneous to, operation 302 and/or operation 304. That is, the monitoring in operation 306 may occur prior to the charging in operation 302 and/or the discontinuing of the charge in operation 304. Additionally, the monitoring in operation 306 may occur concurrently with the charging in operation 302 and/or the discontinuing of the charge in operation 304. As such, it is understood that the monitoring of operation 306 may occur any time between the electrical coupling of the charging device 200 and the electronic device 100, the recharging of the battery 110 in operation 308.

Figure 4:
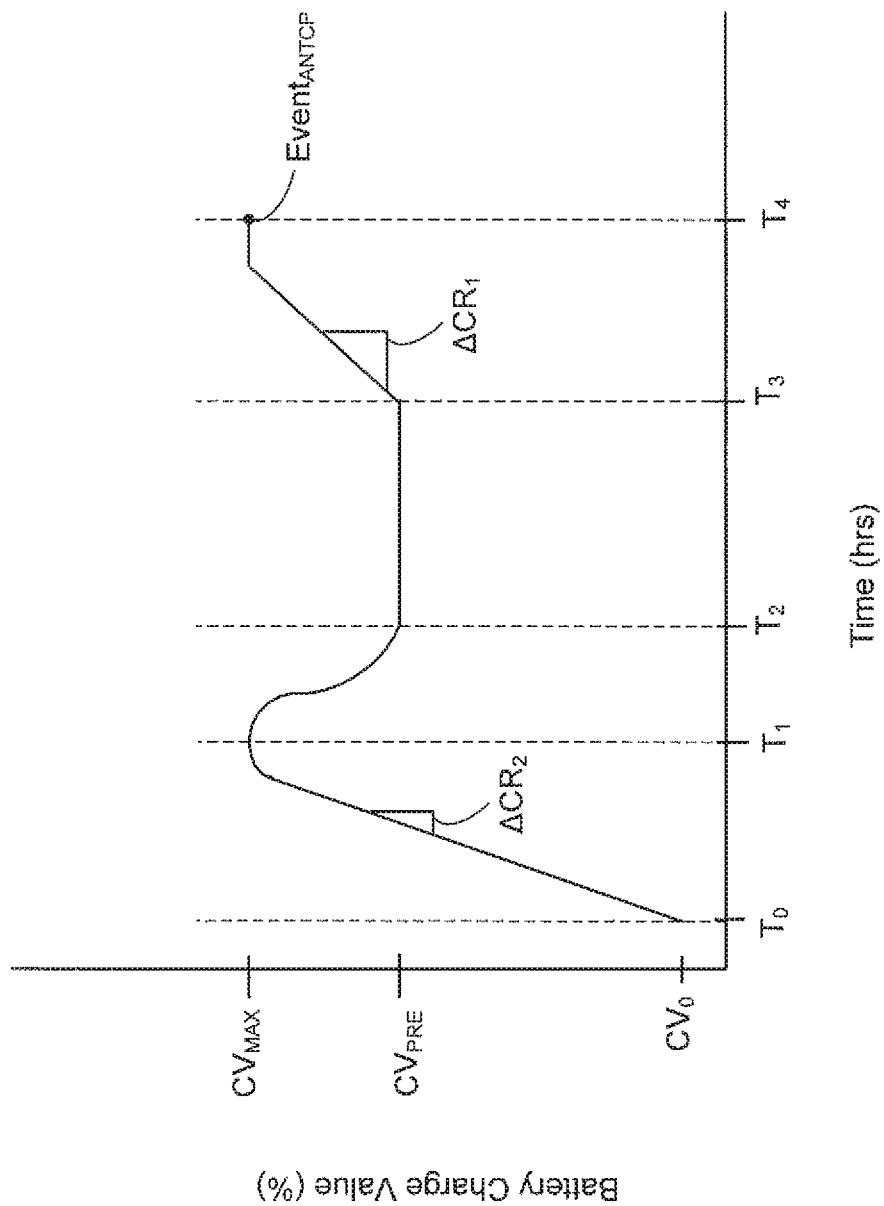
FIGS. 4-7 show illustrative linear graphs representing the method of charging a battery for an electronic device, as depicted in FIG. 3, according to various embodiments.

FIG. 4 shows an illustrative linear graph representing the method of charging the battery 110 for the electronic device 100, as depicted in FIG. 3. An example of charging the battery 110 of the electronic device 100 using the method depicted in FIG. 3 may now be discussed with respect to FIG. 4.

As shown in FIG. 4, the linear graph may represent the charge value of the battery 110 over a period of time. More specifically, the linear graph may represent the charge value of the battery 110 in electronic communication with the charging system 126, when the charge value of the battery 110 is determined and/or modified by the charging system 126, of the system discussed herein. In the example embodiment, as shown in FIG. 4 and discussed herein, an anticipated event may be detected by the charging system 126.

The charging system 126 may determine that the electronic device 100 may be electrically coupled to the charging device 200 at initial time $T_0$ to charge the battery 110. As shown in FIG. 4, at initial time $T_0$, the charging system 126 may determine that the battery 110 may be partially-depleted to include an initial charge value ($CV_0$) less than the threshold charge value for the battery 110. The initial charge value ($CV_0$) may be any charge value that is less than the threshold charge value for the battery 110. As discussed herein, the threshold charge value may be any predetermined charge value for the battery 110 of the electronic device 100. In a non-limiting example, as shown in FIG. 4, threshold charge value may include a maximum charge value ($CV_{MAX}$) (e.g., 100%) for the battery 110. As a result of determining the battery 110 includes an initial charge value ($CV_0$) less than the threshold charge value ($CV_{MAX}$), the charging system 126 may begin to charge the battery 110. More specifically, as shown in FIG. 4, the charging system 126 may begin to charge the battery 110 over a period of time, such that the battery 110 may eventually include a charge value equal to the threshold charge value ($CV_{MAX}$). As shown in FIG. 4, the battery 110 may be charged to include the threshold charge value ($CV_{MAX}$) at a charge time $T_1$. The charging of the battery 110 between the electrical coupling at initial time $T_0$ and threshold charge value of battery 110 at the charge time $T_1$ may corresponding to the charging in operation 302 of FIG. 3.

It is understood, that the threshold charge value may include any predetermined charge value for the battery 110 of the electronic device 100. More specifically, the threshold charge value may include a predetermined charge value for the battery 110 that is less than the maximum charge value ($CV_{MAX}$), as shown in FIG. 4. In a non-limiting example, the threshold charge value for the battery 110 may include a 90% charge. That is, and as similarly discussed herein, it may be determined that the battery 110 includes an initial charge value ($CV_0$) less than the threshold charge value of 90% of the charge of the battery 110. As a result, the charging system 126 may begin to charge the battery 110 to eventually include a charge value equal to the threshold charge value (e.g., 90%).

As shown in FIG. 4, the charging system 126 may charge the battery 110 at a second charge rate ($\Delta CR_2$), which may be greater than a first charge rate ($\Delta CR_1$), as discussed herein. The charging system 126 may initially charge the battery 110 at the increased, second charge rate ($\Delta CR_2$) between time $T_0$ and $T_1$ to achieve the threshold charge value ($CV_{MAX}$) for the battery 110 as quickly as possible. When the battery 110 is being charged at the second charge rate ($\Delta CR_2$), the charging system 126 may be instructing or requesting the maximum amount of electrical current capable of being provided to the electronic device 100 and/or capable of being drawn by the charging device 200.

As shown in FIG. 4, once the battery 110 reaches the threshold charge value ($CV_{MAX}$) at the charge time $T_1$, charging system 126 may allow the charge value (CV) of the battery 110 to gradually deplete. That is, between charge time $T_1$ and charge time $T_2$, the charge value for the battery 110 of the electronic device 100 may gradually deplete from the threshold charge value ($CV_{MAX}$). The gradual depletion of the charge value of the battery 110 of the electronic device 100 may be a result of the charging system 126 discontinuing the charge of the battery 110 in response to the battery 110 being charged to the threshold charge value ($CV_{MAX}$) at charge time $T_1$. The discontinuing of the charge to the battery 110, and the depletion of the charge value between charge time $T_1$ and charge time $T_2$, as shown in FIG. 4, may corresponded to operation 304 in FIG. 3.

As discussed herein, the discontinuing of the charge to the battery 110 may be controlled by the charging system 126 while substantially maintaining the electrical coupling between the charging device 200 and the battery 110 of the electronic device 100. In maintaining the electrical coupling between the charging device 200 and the battery 110 of the electronic device 100, the charging system 126 may be able to reinitiate the charging of the battery 110 at any time during the charging process. That is, when the charging device 200 remains electrically coupled to and in electronic communication with the battery 110 of the electronic device 100, the charging system 126 may discontinue and/or recharge the battery 110 immediately after the detection of an event (e.g., unanticipated event) that may require the battery 110 to be charged to the threshold charge value ($CV_{MAX}$) instantaneously.

At charge time $T_2$, the charging system 126 may determine that the battery 110 includes a predetermined, partial charge value $CV_{PRE}$. That is, the charging system 126 may continuously monitor the charge value (CV) of the battery 110 after discontinuing the charge at charge time $T_1$, to identify when the charge value (CV) for the battery 110 equals the predetermined, partial charge value ($CV_{PRE}$) at charge time $T_2$. When the battery 110 includes the predetermined, partial charge value ($CV_{PRE}$), the charging system 126 may be configured to maintain the battery 110 at predetermined, partial charge value ($CV_{PRE}$). That is, subsequent to the discontinuing of the charge, and the resulting depletion of the charge value (CV) for the battery 110, the charging system 126 may be configured to detect and substantially maintain the battery 110 at the predetermined, partial charge value ($CV_{PRE}$). The charging system 126 may substantially maintain the predetermined, partial charge value ($CV_{PRE}$) for the battery 110 between second charge time $T_2$ and charge time $T_3$. More specifically, as shown in FIG. 4, between charge time $T_2$ and charge time $T_3$, the charging system 126 may allow the charging device 200 to provide a temporary, partial-charge to the battery 110, when the partial-charge substantially maintains the predetermined, partial charge value ($CV_{PRE}$) for the battery 110. That is, the partial-charge provided to the battery 110 between charge time $T_2$ and charge time $T_3$ may substantially maintain the predetermined, partial charge value ($CV_{PRE}$) and may not substantially fluctuate from the predetermined, partial charge value ($CV_{PRE}$).

Figure 5:
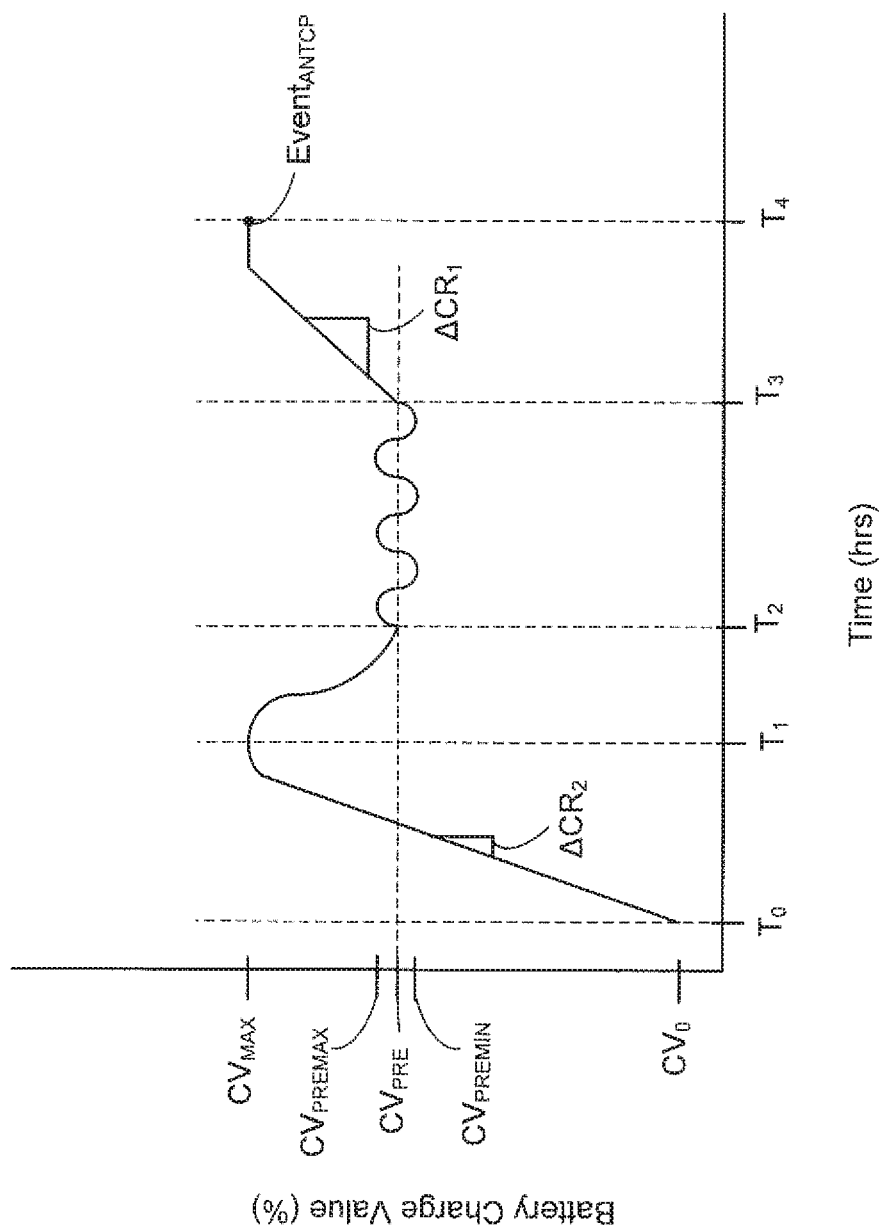

Briefly turning to FIG. 5, an alternative embodiment for maintain the predetermined, partial charge value ($CV_{PRE}$) may be shown. Specifically, as shown in FIG. 5, between charge time $T_2$ and charge time $T_3$, the charging system 126 may maintain an average predetermined, partial charge value ($CV_{PRE}$) for the battery 110 by fluctuating the charge value of the battery 110 between a maximum predetermined, partial charge value ($CV_{PREMAX}$), and a minimum predetermined, partial charge value ($CV_{PREMIN}$) As shown in FIG. 5, both the maximum predetermined, partial charge value ($CV_{PREMAX}$), and the minimum predetermined, partial charge value ($CV_{PREMIN}$) may be substantially below the threshold charge value ($CV_{MAX}$) for the battery 110, to substantially prevent negatively effecting the life of the battery 110, as discussed herein. The charging system 126 may fluctuate the charge value (CV) for the battery 110 between the maximum predetermined, partial charge value ($CV_{PREMAX}$), and the minimum predetermined, partial charge value ($CV_{PREMIN}$) by repeatedly charging and discontinuing the charging of the battery 110, as discussed herein.

As discussed herein, the predetermined, partial charge value ($CV_{PRE}$) for the battery 110 of the electronic device 100 may be dependent upon the charge rate (e.g., first charge rate, second charge rate) applied by the charging system 126 for recharging the battery 110. More specifically, and as discussed herein, dependent upon the detection of an anticipated event and/or an unanticipated event, and the corresponding charge rate associated with the respective events, the charging system 126 may adjust the charge value (CV) for the predetermined, partial charge value ($CV_{PRE}$) for the battery 110.

Returning to FIG. 4, at any time between the initial time $T_0$ of electrically coupling the battery 110 of the electronic device 100 to the charging system 126 and charge time $T_3$, the charging system 126 may monitor the functions of the electronic device 100 to detect the anticipated event (Event$_{ANTCP}$). That is, and as discussed herein, the charging system 126 may monitor the functions of the electronic device 100 prior to, during, or subsequent to the charging of the battery 110 (e.g., $T_0$-$T_1$), the discontinuing of the charge to the battery 110 (e.g., $T_1$-$T_2$) and/or the maintaining of the predetermined, partial charge value ($CV_{PRE}$) of the battery 110 (e.g., $T_2$-$T_3$) to detect the anticipated event (Event$_{ANTCP}$).

As shown in FIG. 4, the charging system 126 may monitor the function of the electronic device 100 to detect the anticipated event (Event$_{ANTCP}$) is expected to occur at charge time $T_4$. That is, the charging system 126 may interact with other components of the electronic device 100 (e.g., memory 114 and the processing device 112) to determine that the electronic device 100 has an anticipated event (Event$_{ANTCP}$) that may be expected to occur at charge time $T_4$. In a non-limiting example, the anticipated event (Event$_{ANTCP}$) occurring at charge time $T_4$ may include an alarm of the electronic device 100 scheduled for charge time $T_4$. The monitoring to detect anticipated event (Event$_{ANTCP}$) at charge time $T_4$ may correspond to operation 306 in FIG. 3.

As shown in FIG. 4, between charge time $T_3$ and charge time $T_4$ the battery 110 may be recharged to the threshold charge value ($CV_{MAX}$). More specifically, the charging system 126 may allow the charging device 200 to recharge the battery 110 at a first charging rate ($\Delta CR_1$) to the threshold charge value ($CV_{MAX}$) prior to the occurrence of the anticipated event (Event$_{ANTCP}$) at charge time $T_4$. By charging the battery 110 at first charging rate ($\Delta CR_1$), rather than the increased, second charging rate ($\Delta CR_2$), battery 110 may be charged to threshold charge value ($CV_{MAX}$) using less electrical current. That is, when the charging system 126 detects anticipated event (Event$_{ANTCP}$), and may recharge the battery 110 to threshold charge value ($CV_{MAX}$) over a predetermined time, as discussed below, the charging system 126 may charge the battery 110 at first charging rate ($\Delta CR_1$).

Because first charging rate ($\Delta CR_1$) requires less electrical current from the charging device 200, the charging of the battery 110 may reduce the home-electrical cost of charging the battery 110, and/or may also allow the battery 110 to be charged with an electrical current below the maximum allowed current for the electronic device 100. This may ultimately, provide less electrical stress to the battery 110 and/or the electronic device 100 during the charging process discussed herein. The recharging of the battery 110 between the third charge time T3 and the fourth charge time T4 may correspond to operation 308 in FIG. 3.

As shown in FIG. 4, and discussed herein, the time between charge time $T_3$ and charge time $T_4$ may be the predetermined time for charging the battery 110, which may be dependent upon the anticipated event, the predetermined, partial charge value ($CV_{PRE}$) and/or the rate of charging the battery 110 prior to the anticipated event (Event$_{ANTCP}$). That is, the charging system 126 may determine that the charging device 200 may begin charging the battery 110 at charge time $T_3$, as a result of the battery 110 being charged at the first charge rate and/or the anticipated event (Event$_{ANTCP}$) expected to occur at charge time $T_4$.

As shown in FIG. 4, by determining and beginning the recharging of the battery 110 at charge time $T_3$, the charging system 126 may ensure that the battery 110 is charged and maintained at the threshold charge value ($CV_{MAX}$) prior to the anticipated event (Event$_{ANTCP}$). As a result, when the anticipated event (Event$_{ANTCP}$) occurs, and the electronic device 100 is immediately uncoupled from the charging device 200 at charge time $T_4$, the battery 110 of the electronic device 100 may include the threshold charge value ($CV_{MAX}$), and may only have reached the threshold charge value ($CV_{MAX}$) twice during the charging process performed by charging system 126 (e.g., $T_0$-$T_4$).

Figure 6:
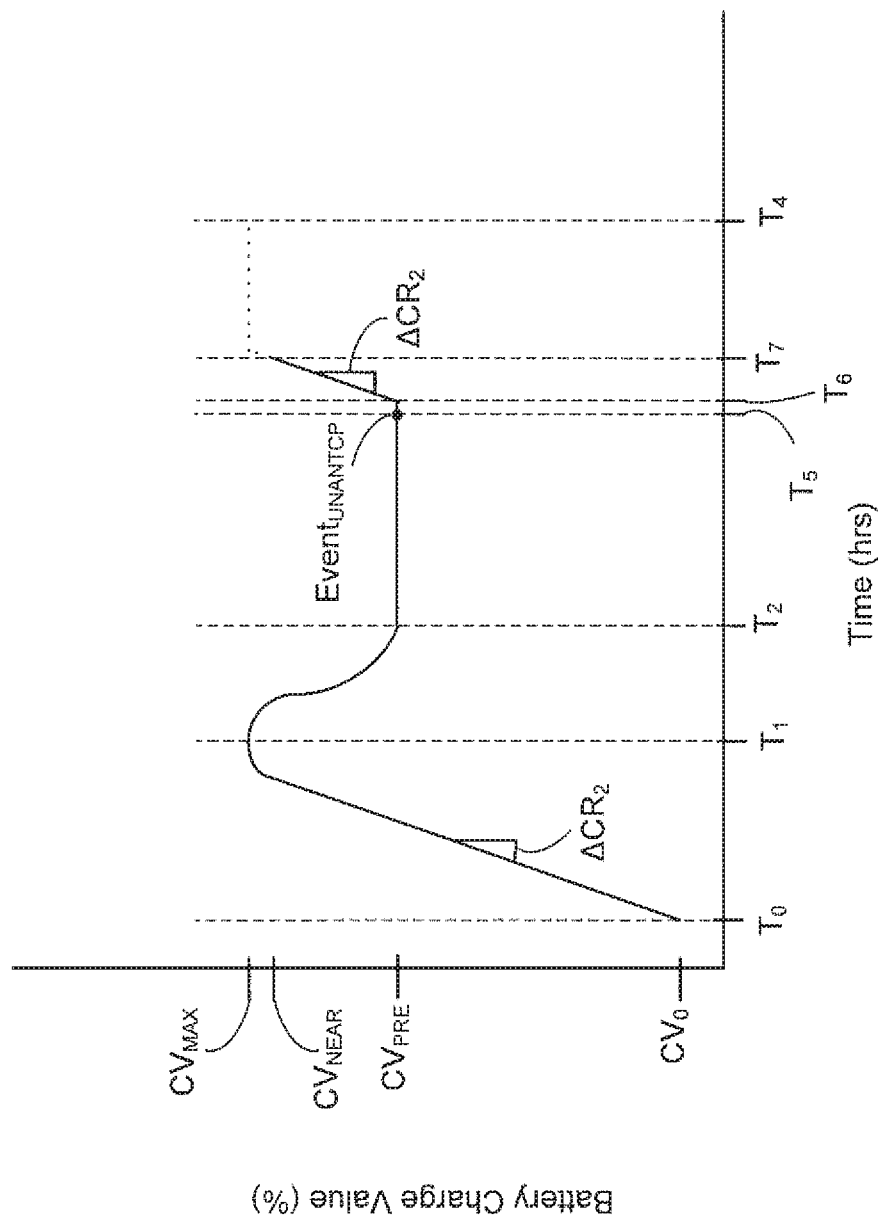

Turning to FIG. 6, a linear graph, according to an alternative embodiment, may represent the charge value of the battery 110 in electronic communication with the charging system 126, when the charge value of the battery 110 is determined and/or modified by the charging system 126, of the system discussed herein. In the embodiment, as shown in FIG. 6 and discussed herein, an unanticipated event (Event$_{UNANTCP}$) may be detected by the charging system 126.

As shown in FIG. 6, the linear graph representing the charge value for the battery 110 of the electronic device 100 may function and/or may undergo processes by the charging system 126 similar to those discussed in FIG. 4. That is, the linear graph illustrated in FIG. 6 may be substantially identical to the linear graph in FIG. 4 between the initial time $T_0$ and charge time $T_2$. The similarity may be a result of the charging system 126 performing substantially similar, initial processes (e.g., charging, discontinuing the charging, etc.) with respect to an anticipated event (Event$_{ANTCP}$) (see, FIG. 4) and an unanticipated event (Event$_{UNANTCP}$) (FIG. 6). As such, redundant explanation of the charge value for the battery 110, as shown in FIG. 6 between the initial time $T_0$ and charge time $T_2$ is omitted for clarity.

However, and in comparison to FIG. 4, after charge time $T_2$, and specifically, during the maintaining of the predetermined, partial charge value ($CV_{PRE}$) of the battery 110, the unanticipated event (Event$_{UNANTCP}$) may be detected by the charging system 126. More specifically, the charging system 126 may continuously monitor the function of the electronic device 100, and ultimately may detect the occurrence of the unanticipated event (Event$_{UNANTCP}$) at charge time $T_5$. As discussed herein, the unanticipated event (Event$_{UNANTCP}$) may include a spontaneous or unexpected interaction with the electronic device 100 while the electronic device 100 is undergoing the charging processes discussed herein with respect to FIG. 3. In a non-limiting example, the unanticipated event (Event$_{UNANTCP}$), as shown in FIG. 6, may include a user unexpectedly checking the time using the electronic device 100 after randomly waking up in the middle of the night.

As shown in FIG. 6, once the unanticipated event (Event$_{UNANTCP}$) is detected, the charging system 126 may begin the recharging of the battery 110. That is, immediately subsequent to the detection and/or occurrence of the unanticipated event (Event$_{UNANTCP}$) at charge time $T_5$, the charging system 126 may allow the charging device to provide current to the battery 110 at charge time $T_6$ to recharge the battery 110 to the threshold charge value ($CV_{MAX}$), or close to the threshold charge value ($CV_{MAX}$).

The charging system 126 may allow the battery 110 to be charged at the second charge rate ($\Delta CR_2$), which may be greater than the first charge rate ($\Delta CR_1$) (see, FIG. 4). More specifically, the charging system 126 may allow the battery 110 to be charged at the second charge rate ($\Delta CR_2$) so the battery 110 may be charged to the threshold charge value ($CV_{MAX}$) or as close to it as possible, over, for example, the shortest possible duration of time. That is, because of the spontaneity of unanticipated event ($Event_{UNANTCP}$), and/or the inability of the charging system 126 to detect the unanticipated event ($Event_{UNANTCP}$) until after the event occurs, it may not be determined how long the electronic device 100 will remain electrically coupled to charging device after the occurrence unanticipated event ($Event_{UNANTCP}$). As such, the charging system 126 may charge the battery 110 at the greater, second charge rate ($\Delta CR_2$), in order for the battery 110 to include a greater charge value prior to the uncoupling of the electronic device 100 and the charging device 200.

As shown in FIG. 6, the battery 110 may be charged at the second charge rate ($\Delta CR_2$) between charge time $T_6$ and charge time $T_7$, where at charge time $T_7$, the electronic device 100 may be uncoupled from the charging device 200. As a result of uncoupling the electronic device 100 from the charging device 200 at charge time $T_7$, the battery 110 may not be completely charged to the threshold charge value ($CV_{MAX}$), but may only be charged to a nearly threshold charge value ($CV_{NEAR}$). However, as shown in phantom in FIG. 6, if the electronic device 100 remained electrically coupled to the charging device 200 until charge time $T_4$, the battery 110 may be charged to the threshold charge value ($CV_{MAX}$), as similarly discussed with respect to FIG. 4.

Figure 7:
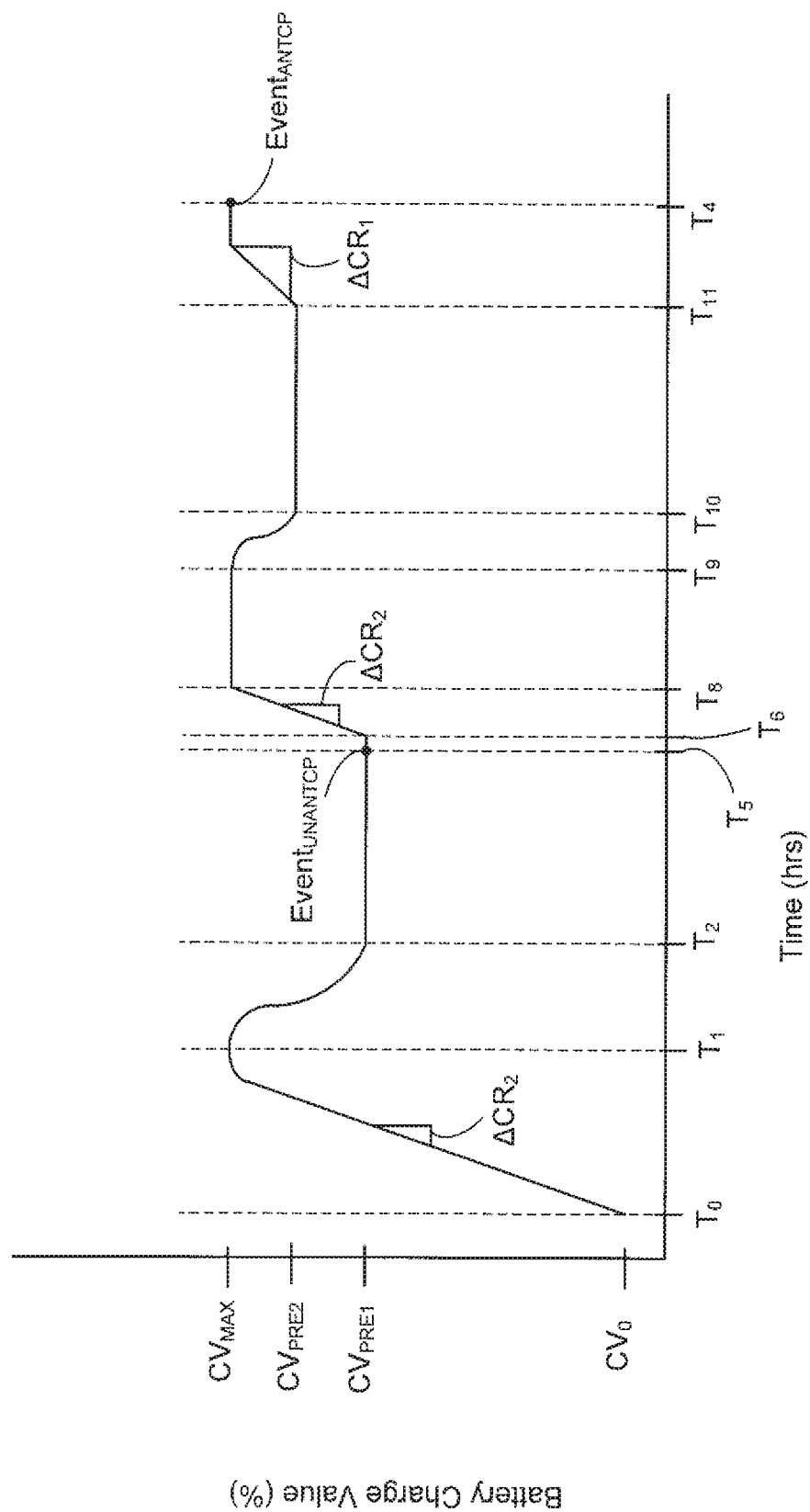

In an additional embodiment, the charging system 126 may detect both an anticipated event ($Event_{ANTCP}$) and an unanticipated event ($Event_{UNANTCP}$) while the battery 110 is in electronic communication within the charging system 126. That is, as shown in FIG. 7, which the battery 110 of the electronic device 100 is in electronic communication with the charging system 126, both an anticipated event ($Event_{ANTCP}$) and an unanticipated event ($Event_{UNANTCP}$) may be detected by the charging system 126. When both an anticipated event ($Event_{ANTCP}$) and an unanticipated event ($Event_{UNANTCP}$) are detected by the charging system 126, the predetermined, partial charge value ($CV_{PRE}$) substantially maintained by the charging system 126 may vary.

In the example embodiment shown in FIG. 7, a non-limiting example of an anticipated event ($Event_{ANTCP}$) may include an alarm on the electronic device 100, as discussed above with respect to FIG. 4. Additionally, a non-limiting example of an unanticipated event ($Event_{UNANTCP}$) may include a user unexpectedly checking the time using the electronic device 100 while the battery 110 is in electronic communication with the charging system 126, as discussed above with respect to FIG. 6.

The linear graph representing the charge value for the battery 110 of the electronic device 100 in FIG. 7 may function and/or may undergo processes by the charging system 126 similar to those discussed in FIGS. 4 and/or 6. More specifically, as discussed above with respect to FIGS. 4 and/or 6, the battery 110 may be electrically coupled with the charging system 126 at initial time $T_0$, and may be charged to the threshold charge value ($CV_{MAX}$) between initial time $T_0$ and charge time $T_1$. Additionally, as similarly discussed with respect to FIG. 4, the charging system 126 may detect the anticipated event ($Event_{ANTCP}$) at charge time $T_4$ by monitoring the function of the electronic device 100. Finally, and as similarly discussed with respect to FIG. 6, the charging system 126 may detect the unanticipated event ($Event_{UNANTCP}$) at charge time $T_5$ and may immediately allow the battery 110 to be recharged at the second charge rate ($\Delta CR2$) at charge time $T_6$.

As shown in FIG. 7, between charge time $T_5$ and charge time $T_6$, the charging system 126 may maintain the battery 110 at a first predetermined, partial charge value ($CV_{PRE1}$). The first predetermined, partial charge value ($CV_{PRE1}$) may be substantially equal to a predetermined, partial charge value ($CV_{PRE}$) determined by the charging system 126, when an anticipated event ($Event_{ANTCP}$) is detected (see, FIG. 4). That is, and as discussed herein, when an anticipated event ($Event_{ANTCP}$) is detected by the charging system 126 at charge time $T_4$, the charging system 126 may allow the battery 110 to deplete to first predetermined, partial charge value ($CV_{PRE1}$) at charge time $T_2$, and may substantially maintain first predetermined, partial charge value ($CV_{PRE1}$) until a time when recharging of the battery 110 is required (e.g., $T_4$, $T_6$), as discussed herein.

As similarly discussed herein with respect to FIG. 6, the charging system 126 may allow the charging device 200 to begin charging the battery 110 to the threshold charge value ($CV_{MAX}$) at charge time $T_6$. As shown in FIG. 7, the battery 110 may be charged to the threshold charge value ($CV_{MAX}$) at charge time $T_8$ and may be subsequently maintained at the threshold charge value ($CV_{MAX}$). The battery 110 may be maintained at the threshold charge value ($CV_{MAX}$) in anticipation of the battery 110 of the electronic device 100 being uncoupled from the charging device 200 by the user. However, if the battery 110 remains in electronic communication with the charging device 200 for a predetermined time, the charging system 126 may again discontinue the charge to the battery 110 and may allow the charge value of the battery 110 to begin to deplete. The predetermined time may be indicated by the time between charge time $T_8$ and charge time $T_9$, where at charge time $T_9$, the charging system 126 may discontinue the charge supplied to the battery 110 by the charging device 200, and may allow the charge value (CV) of the battery 110 to deplete, as similarly discussed with respect to FIG. 4 between charge time $T_1$ and charge time $T_2$.

The charging system 126 may allow charging value (CV) to deplete until charge time $T_{10}$, when the charge value (CV) for the battery 110 is equal to a second predetermined, partial charge value ($CV_{PRE2}$). As shown in FIG. 7, the second predetermined, partial charge value ($CV_{PRE2}$) for the battery 110 may be substantially greater than the first predetermined, partial charge value ($CV_{PRE1}$) between charge time $T_2$ and $T_5$. The charging system 126 may adjust the predetermined, partial charge value ($CV_{PRE}$) for the battery 110 in response to the detecting of the unanticipated event ($Event_{UNANTCP}$) at charge time $T_5$. That is, and as discussed herein, the predetermined, partial charge value ($CV_{PRE}$) for the battery 110 may be dependent upon, at least in part, the charge rate ($\Delta CR$) for recharging the battery 110 and/or the detection of an anticipated event ($Event_{ANTCP}$) and/or an unanticipated event ($Event_{UNANTCP}$) by the charging system 126. As such, and as shown in FIG. 7, the first predetermined, partial charge value ($CV_{PRE1}$) determined by the charging system 126 may be dependent on the detection of the anticipated event ($Event_{ANTCP}$) expected to occur at charge time $T_4$. However, the detection and/or the occurrence of the unanticipated event ($Event_{UNANTCP}$) at charge time $T_5$ by the charging system 126 may result in the charging system 126 to adjust the predetermined, partial charge value ($CV_{PRE}$) to the second predetermined, partial charge value ($CV_{PRE2}$). The charging system 126 may adjust to the second predetermined, partial charge value ($CV_{PRE2}$) to relatively ensure that subsequent recharging processes performed on the battery 110 may result in the battery 110 including the threshold charge value ($CV_{MAX}$) before the anticipated event (Event$_{ANTCP}$) occurs and/or the battery 110 is uncoupled from the charging device 200. That is, by maintaining the battery 110 at the second predetermined, partial charge value (CV$_{PRE2}$), which may be greater than the first predetermined, partial charge value (CV$_{PRE1}$), the battery 110 may be more quickly charged to the threshold charge value (CV$_{MAX}$) when another unanticipated event (Event$_{UNANTCP}$) occurs, and/or before an anticipated event (Event$_{ANTCP}$) occurs.

The second predetermined, partial charge value (CV$_{PRE2}$) for the battery 110 may be substantially maintained by the charging system 126 between charge time T$_{10}$ and T$_{11}$, as similarly discussed herein with respect to FIG. 4 between charge time T$_2$ and charge time T$_3$. That is, the charging system 126 may maintain the second predetermined, partial charge value (CV$_{PRE2}$) for the battery 110, without the detection of a distinct unanticipated event (Event$_{UNANTCP}$). As similarly discussed herein with respect to FIG. 4 between charge time T$_3$ and T$_4$, the charging system 126 may allow the charging device 200 to recharge the battery 110 at charge time T$_{11}$. More specifically, at charge time T$_{11}$, the charging system 126 may begin to charge the battery 110 at a first charge rate (ΔCR$_1$) to the threshold charge value (CV$_{MAX}$), and may substantially maintain the battery 110 at the threshold charge value (CV$_{MAX}$) prior to the occurrence of the anticipated event (Event$_{ANTCP}$) at charge time T$_4$. As similarly discussed herein with respect to FIG. 4, the time duration between charge time T$_{11}$ and T$_4$ may represent the predetermined time for recharging the battery 110 to ensure the battery 110 will include the threshold charge value (CV$_{MAX}$) prior to the occurrence of the anticipated event (Event$_{ANTCP}$).

By utilizing the charging system 126 to charge the battery 110 of the electronic device 100, the charging of the battery 110 may be dependent upon the monitoring and/or the occurrence of events (e.g., anticipated, unanticipated) of the electronic device 100, and not cycling between threshold charge values and minimum charge values. As a result, the charging system 126 utilized by the electronic device 100 may substantially prevent undesirable depletion of the battery's 110 ability to maintain a charge. That is, by eliminating the cycling charging of the battery 110 of the electronic device 100, the charging system 126 utilized by the electronic device 100 may minimize and substantially prevent the depletion of the battery's 110 ability to maintain a charge.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

We claim:

1. An electronic device comprising:
   a battery; and
   a processing system in electronic communication with the battery and configured to:
   detect a reoccurring interaction with the electronic device;
   initiate a charging of the battery;
   discontinue the charging, thereby causing at least a partial depletion of the battery;
   determine, based on the reoccurring interaction, an expected uncoupling event of the electronic device; and
   reinitiate the charging of the battery at a charge time before the expected uncoupling event.

2. The electronic device of claim 1, wherein determining the expected uncoupling event of the electronic device comprises:
   learning when a user regularly couples the electronic device to a charging device; and
   learning when the user regularly uncouples the electronic device from the charging device.

3. The electronic device of claim 2, wherein:
   the user regularly couples the electronic device to the charging device at a first time; and
   the user regularly uncouples the electronic device to the charging device at a second time after the first time.

4. The electronic device of claim 1, wherein the processing system is further configured to detect an unanticipated event after the charging of the battery is initiated and before the charging of the battery is reinitiated at the charge time.

5. The electronic device of claim 4, wherein:
   the charge time is a first charge time; and
   the processing system is further configured to reinitiate the charging of the battery at a second charge time corresponding to the unanticipated event, the second charge time before the first charge time.

6. The electronic device of claim 1, wherein the reoccurring interaction includes times when a user has previously coupled and uncoupled the electronic device from a charging device.

7. The electronic device of claim 1, wherein the processing system comprises:
   a charging system configured to charge the battery; and
   a processing device configured to control operations of the electronic device.

8. A charging device for an electronic device, the charging device comprising:
   a connection portion configured to couple to a battery of the electronic device; and
   a processing system in electronic communication with the connection portion and configured to:
   detect a reoccurring interaction with the electronic device;
   determine that the charging device is coupled to the battery of the electronic device;
   permit a depletion of the battery;
   determine, based on the reoccurring interaction, an expected uncoupling time of the electronic device; and
   initiate a charging of the battery at a charge time before the expected uncoupling time.

9. The charging device of claim 8, wherein the reoccurring interaction includes regular times for:
   coupling the charging device to the electronic device; and
   uncoupling the charging device from the electronic device.

10. The charging device of claim 9, wherein:
    coupling the charging device to the electronic device occurs at a first time; and
    uncoupling the charging device from the electronic device occurs at a second time after the first time.

11. The charging device of claim 8, wherein the expected uncoupling time of the electronic device occurs during a programmable alarm that alerts a user of the electronic device.

12. The charging device of claim 11, wherein the electronic device is charged to a maximum charge value at the expected uncoupling time.

13. The charging device of claim 11, wherein:
the charge time is a first charge time; and
the processing system is further configured to:
  detect an unanticipated event occurring before the programmable alarm;
  initiate the charging of the battery at a second charge time occurring before the first charge time; and
  discontinue the charging of the battery at a third charge time occurring before the first charge time and after the second charge time.

14. The charging device of claim 8, wherein:
the connection portion includes a plurality of contact pins;
the plurality of contact pins of the connection portion contact a battery charging port of the electronic device to charge the battery; and
electrical current is transferred from the charging device to the battery via the plurality of contact pins.

15. A method for charging a battery of an electronic device, the method comprising:
detecting a reoccurring interaction with the electronic device;
electrically coupling the battery of the electronic device to a charging device;
permitting a depletion of the battery;
determining, based on the reoccurring interaction, an expected uncoupling time of the electronic device; and
initiating a charging of the battery before the expected uncoupling time.

16. The method of claim 15, wherein:
permitting the depletion occurs at a first charge time;
initiating the charging of the battery occurs at a second charge time after the first charge time; and
the method further comprises:
  detecting an unanticipated event at a third charge time after the first charge time and before the second charge time; and
  reinitiating the charging of the battery at the third charge time.

17. The method of claim 16, further comprising discontinuing the charging at a fourth charge time after the third charge time.

18. The method of claim 15, further comprising:
learning when a user regularly couples the electronic device to the charging device; and
learning when the user regularly uncouples the electronic device from the charging device.

19. The method of claim 18, wherein:
the user regularly couples the electronic device to the charging device at a first time; and
the user regularly uncouples the electronic device to the charging device at a second time after the first time.

20. The method of claim 15, wherein the reoccurring interaction is at least one of a learned interaction or a regular interaction that a user has with the electronic device.

* * * * *